US012657114B2

(12) United States Patent
Zekri et al.

(10) Patent No.: US 12,657,114 B2
(45) Date of Patent: Jun. 16, 2026

(54) ASCERTAINING APPLICATION TEST COVERAGE

(71) Applicant: Dell Products L.P., Round Rock, TX (US)

(72) Inventors: Ishay Zekri, Kfar Yona (IL); Lev Faiman, Netanya (IL); Amit Ramraz, Hod Hasharon (IL)

(73) Assignee: Dell Products L.P., Round Rock, TX (US)

( * ) Notice: Subject to any disclaimer, the term of this patent is extended or adjusted under 35 U.S.C. 154(b) by 464 days.

(21) Appl. No.: 17/955,650

(22) Filed: Sep. 29, 2022

(65) Prior Publication Data

US 2024/0111662 A1 Apr. 4, 2024

(51) Int. Cl.
*G06F 11/3668* (2025.01)

(52) U.S. Cl.
CPC ...... *G06F 11/3676* (2013.01); *G06F 11/3684* (2013.01)

(58) Field of Classification Search
CPC .......................... G06F 11/3676; G06F 11/3684
See application file for complete search history.

(56) References Cited

U.S. PATENT DOCUMENTS 5,522,079 A 5/1996 Acker et al.
6,502,102 B1 * 12/2002 Haswell .............. G06F 11/3698
707/999.102

6,536,036 B1 * 3/2003 Pavela ................ G06F 11/3676
717/125
7,143,394 B1 * 11/2006 Shadmon ............ G06F 11/3612
717/130
7,197,748 B2 3/2007 Chaiken et al.
(Continued)

FOREIGN PATENT DOCUMENTS

CN 109857637 A * 6/2019

OTHER PUBLICATIONS

Andre Hora, "What Code Is Deliberately Excluded from Test Coverage and Why?", Jun. 28, 2021 [retrieved Dec. 13, 2025], 18th International Conference on Mining Software Repositories, pp. 392-402, downloaded from <url>:https://ieeexplore.ieee.org/abstract/document/9463122. (Year: 2021).*

(Continued)

*Primary Examiner* — S. Sough
*Assistant Examiner* — Stephen D Berman
(74) *Attorney, Agent, or Firm* — BainwoodHuang

(57) ABSTRACT

A technique is directed to ascertaining application test coverage. The technique involves receiving a command to test an application having a set of unmarked sections and a set of marked sections. The command includes a selection parameter that requests at least one of unmarked section coverage results and marked section coverage results. The technique further involves running a test procedure that operates the application to generate section coverage data. The technique further involves, after running the test procedure, generating application coverage results from the section coverage data. The application coverage results describes test procedure coverage of at least one of the set of unmarked sections of the application and the set of marked sections of the application based on the selection parameter of the command.

15 Claims, 5 Drawing Sheets

500

Receive command to test an application having a set of unmarked sections and a set of marked sections, the command including a selection parameter that requests at least one of unmarked section coverage results and marked section coverage results
502

Run a test procedure that operates the application to generate section coverage data
504

Generate application coverage results from the section coverate data, the application coverage results describing test procedure coverage of at least one of the set of unmarked sections of the application and the set of marked sections of the application based on the selection parameter of the command
506

(56) References Cited

U.S. PATENT DOCUMENTS

| | | | | |
|---|---|---|---|---|
| 7,565,645 B2 * | 7/2009 | Barrs | .................. | G06F 11/3636 |
| | | | | 707/999.203 |
| 8,321,689 B2 | 11/2012 | Smeets et al. | | |
| 10,261,889 B2 | 4/2019 | Asthana et al. | | |
| 10,509,715 B2 * | 12/2019 | White, Jr. | ............... | G06F 21/53 |
| 11,003,575 B1 * | 5/2021 | Knajtner | ............. | G06F 16/2379 |
| 11,188,313 B1 * | 11/2021 | Huffman | ............. | G06F 11/3065 |
| 2007/0168998 A1 * | 7/2007 | Mehta | ................. | G06F 11/3676 |
| | | | | 717/130 |
| 2009/0287729 A1 * | 11/2009 | Chen | ................... | G06F 11/3676 |
| | | | | 707/999.102 |
| 2010/0131930 A1 * | 5/2010 | Ben-Chaim | ......... | G06F 11/3688 |
| | | | | 717/127 |
| 2011/0047532 A1 * | 2/2011 | Wang | .................. | G06F 11/3676 |
| | | | | 717/130 |
| 2013/0298110 A1 * | 11/2013 | Boden | ................. | G06F 11/3676 |
| | | | | 717/125 |
| 2017/0083430 A1 * | 3/2017 | Meerovich | ............... | G06F 8/00 |
| 2019/0102282 A1 * | 4/2019 | DeMarco | ........... | G06F 11/3698 |
| 2019/0370156 A1 * | 12/2019 | Kuner | ................. | G06F 11/3676 |
| 2023/0350788 A1 * | 11/2023 | Jain | ..................... | G06F 11/3676 |

OTHER PUBLICATIONS

Hadi Hemmati, "How Effective Are Code Coverage Criteria?", Sep. 25, 2015 [retrieved Dec. 13, 2025], IEEE International Conference on Software Quality, Reliability and Security, pp. 151-156, downloaded from <url>:https://ieeexplore.ieee.org/abstract/document/7272926. (Year: 2015).*

Mustafa Tikir et al., "Efficient instrumentation for code coverage testing", 2002 [retrieved Mar. 3, 2026], ACM SIGSOFT Software Engineering Notes, vol. 27, Issue 4, pp. 86-96, downloaded from <url>:https://dl.acm.org/doi/abs/10.1145/566171.566186. (Year: 2002).*

Marko Ivankovic et al., "Code Coverage at Google", 2019 [retrieved Mar. 3, 2026], ESEC/FSE 2019, pp. 955-963, downloaded from <url>: https://dl.acm.org/doi/abs/10.1145/3338906.3340459. (Year: 2019).*

* cited by examiner

100

150

180 / 182

160

140

190

192

Application
Testing
Equipment
120
Having
Specialized Tool 170
for Ascertaining
Testing Coverage
(e.g., Test Procedures,
Testing Coverage,
Host Computer
Simulators, Test Result
Repository, etc.)

132

130

Application
Development
Equipment
110
(e.g., Editors, Version
Management Tools,
Compilers, Linkers,
Libraries, Debuggers,
Other Building
Tools, etc.)

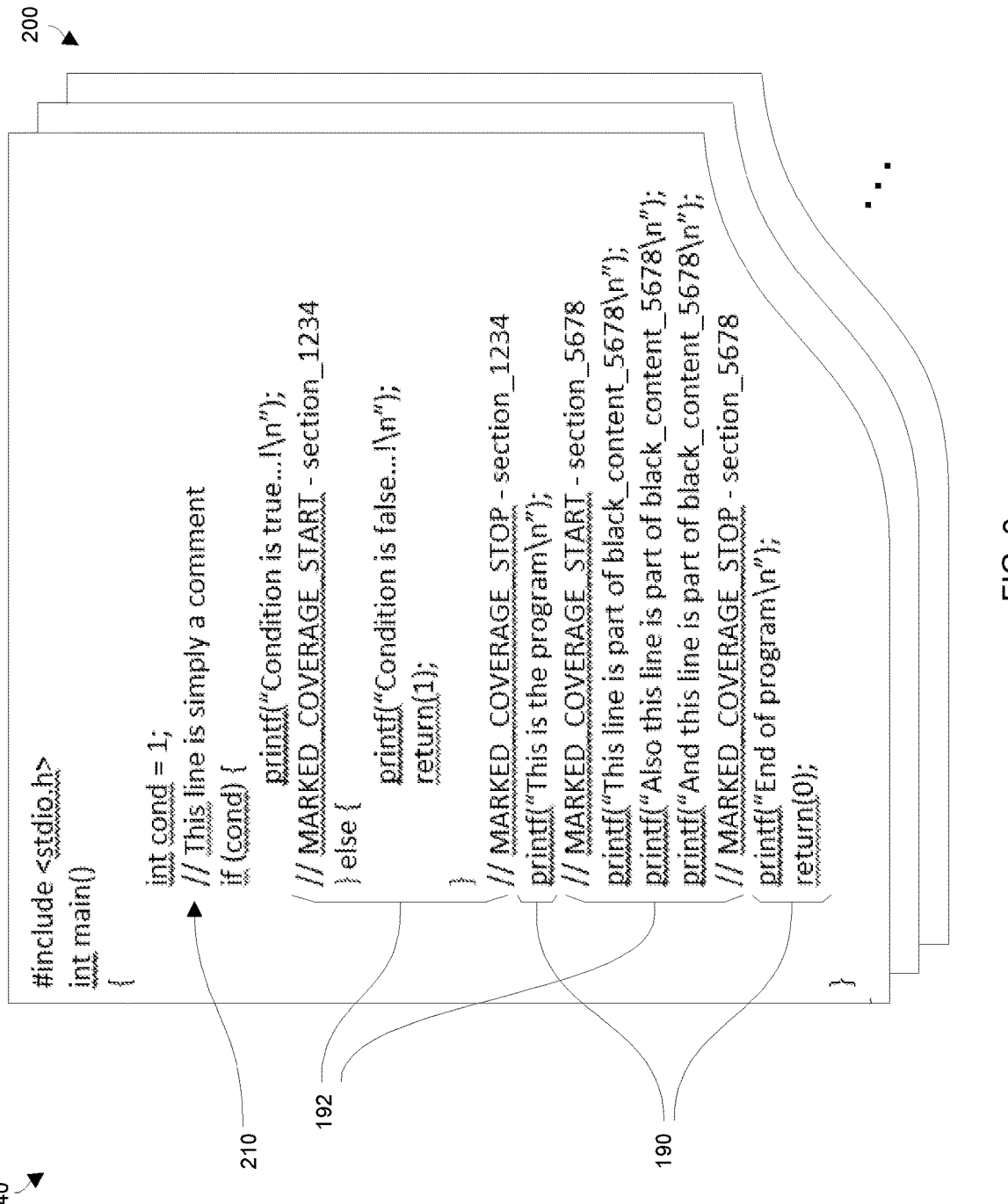

```
#include <stdio.h>
int main()
{
    int cond = 1;
    // This line is simply a comment
    if (cond) {
        printf("Condition is true...!\n");
// MARKED_COVERAGE_START - section_1234
    } else {
        printf("Condition is false...!\n");
        return(1);
    }
// MARKED_COVERAGE_STOP - section_1234
    printf("This is the program\n");
// MARKED_COVERAGE_START - section_5678
    printf("This line is part of black_content_5678\n");
    printf("Also this line is part of black_content_5678\n");
    printf("And this line is part of black_content_5678\n");
// MARKED_COVERAGE_STOP - section_5678
    printf("End of program\n");
    return(0);
}
```

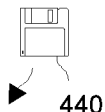
440
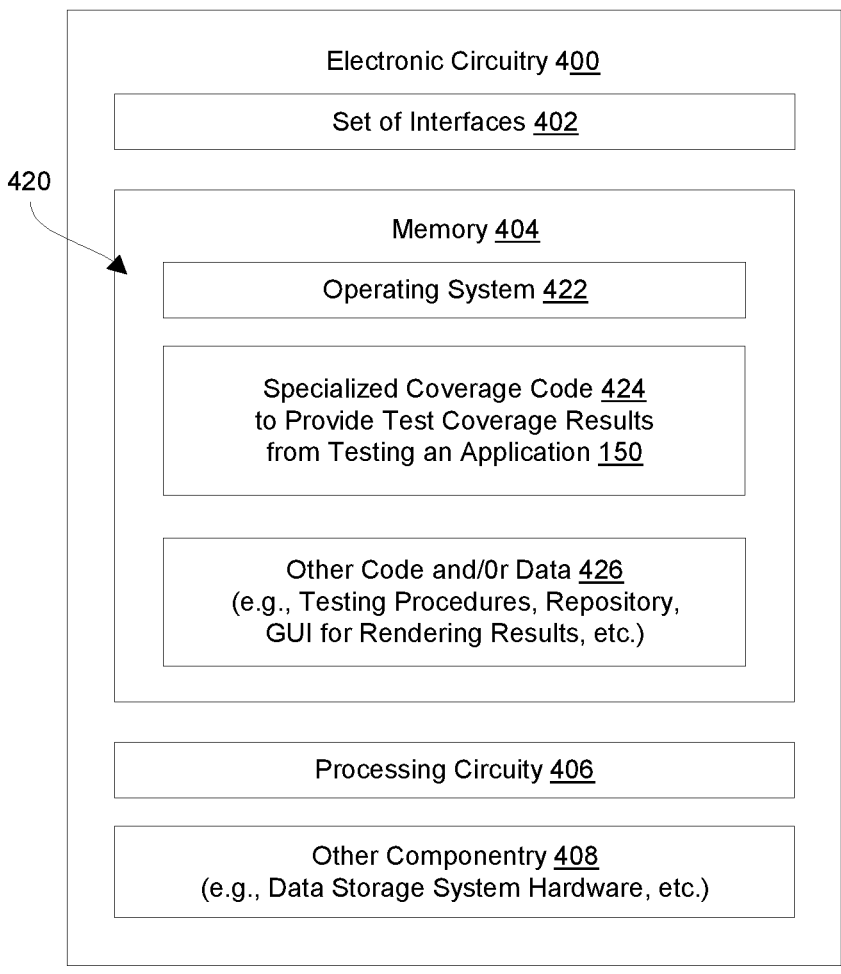
FIG. 4

500

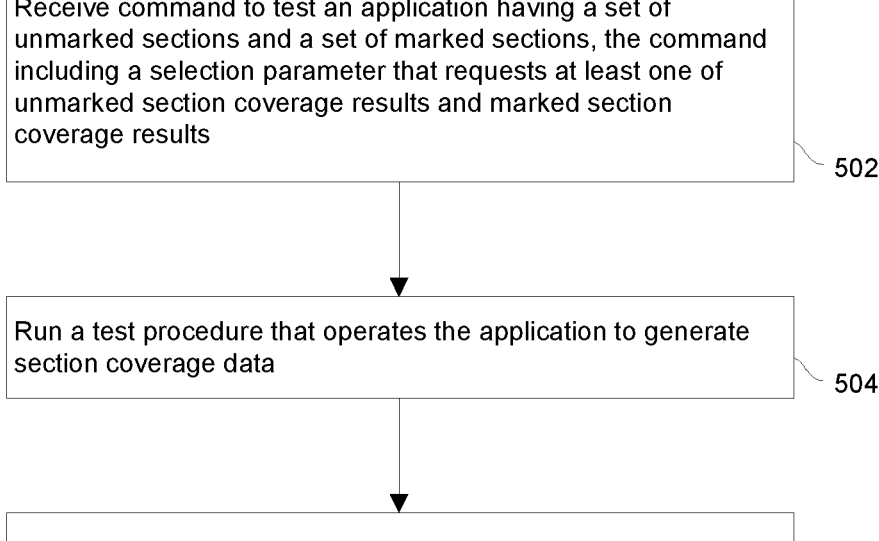

Receive command to test an application having a set of
unmarked sections and a set of marked sections, the command
including a selection parameter that requests at least one of
unmarked section coverage results and marked section
coverage results

502

Run a test procedure that operates the application to generate
section coverage data

504

Generate application coverage results from the section coverate
data, the application coverage results describing test procedure
coverage of at least one of the set of unmarked sections of the
application and the set of marked sections of the application
based on the selection parameter of the command

ASCERTAINING APPLICATION TEST COVERAGE

BACKGROUND

A conventional tool enables a software developer to identify untested parts of a software program. Along these lines, the conventional tool provides counts of the number of times each statement in the program is executed.

If the software developer wishes to exclude parts of the program from the test, the software developer may comment out those parts of the program before creating the binary from the source code. For example, using the C programming language, the software developer may comment out segments of the program by inserting comment indicators such as "/*" in front of the segments and "*/" at the end of the segments. When the software developer then creates the binary from the source code and runs the conventional tool, the commented out parts of the program will not exist within the binary so that no counting takes place for those parts of the program.

SUMMARY

Unfortunately, there are deficiencies to the above-described approach of excluding segments of a software program from a test by commenting out the segments before creating the binary and running the conventional tool. Along these lines, each time the software developer wishes to exclude a different part of the program from the test, the software developer must re-edit the source code to adjust the comment indicators (e.g., add, delete, move, etc. the placements of "/*" and "*/") and then re-create the binary from the re-edited source code. Such an approach is tedious, error prone, and runs the risk of using source code that accidentally contains other changes, etc.

In contrast to the above-described approach, an improved technique utilizes a specialized tool that distinguishes between a set of marked sections of an application and a set of unmarked sections of the application. Along these lines, testing of the application is performed and results are generated that describe test coverage of the set of marked sections only, the set of unmarked sections only, or both based on a command line parameter. Such a parameter may be provided at the time of initiating a test of the application. Such an improved technique alleviates the need to re-edit and re-build the application when ascertaining test coverage of different sections of the application.

One embodiment is directed to a method of ascertaining application test coverage which includes receiving a command to test an application having a set of unmarked sections and a set of marked sections. The command includes a selection parameter that requests at least one of unmarked section coverage results and marked section coverage results. The method further includes running a test procedure that operates the application to generate section coverage data. The method further includes, after running the test procedure, generating application coverage results from the section coverage data. The application coverage results describes test procedure coverage of at least one of the set of unmarked sections of the application and the set of marked sections of the application based on the selection parameter of the command.

Another embodiment is directed to electronic equipment which includes memory and control circuitry coupled to the memory. The memory stores instructions which, when carried out by the control circuitry, cause the control circuitry to perform a method of:

(A) receiving a command to test an application having a set of unmarked sections and a set of marked sections, the command including a selection parameter that requests at least one of unmarked section coverage results and marked section coverage results;

(B) running a test procedure that operates the application to generate section coverage data; and (C) after running the test procedure, generating application coverage results from the section coverage data, the application coverage results describing test procedure coverage of at least one of the set of unmarked sections of the application and the set of marked sections of the application based on the selection parameter of the command.

Yet another embodiment is directed to a computer program product having a non-transitory computer readable medium which stores a set of instructions to process an application. The set of instructions, when carried out by computerized circuitry, causes the computerized circuitry to perform a method of:

(A) receiving a command to test an application having a set of unmarked sections and a set of marked sections, the command including a selection parameter that requests at least one of unmarked section coverage results and marked section coverage results;

(B) running a test procedure that operates the application to generate section coverage data; and (C) after running the test procedure, generating application coverage results from the section coverage data, the application coverage results describing test procedure coverage of at least one of the set of unmarked sections of the application and the set of marked sections of the application based on the selection parameter of the command.

In some arrangements, running the test procedure includes generating the section coverage data while the control circuitry (or computerized circuitry) performs data storage operations to respond to host input/output (I/O) requests from a set of host computers. Such an arrangement is particularly well-suited for testing a data storage application that runs on data storage equipment (e.g., a storage array).

In some arrangements, the method further includes, prior to running the test procedure, building the application having the set of unmarked sections and the set of marked sections from application code having a set of unmarked code portions that build into the set of unmarked sections and a set of marked code portions that build into the set of marked sections.

In some arrangements, building the application includes identifying the set of unmarked code portions and the set of marked code portions within the application code based on a set of text-based markers.

In some arrangements, identifying the set of unmarked code portions and the set of marked code portions within the application code includes detecting a first pair of markers that delineate a first marked code portion within the application code, and detecting a second pair of markers that delineate a second marked code portion within the application code.

In some arrangements, each unmarked code portion of the set of unmarked code portions is a code portion without a pair of markers.

In some arrangements, the first marked code portion and the second marked code portion are non-overlapping.

In some arrangements, the first marked code portion includes a first starting marker of the first pair of markers, first code for a first application operation, and a first ending marker of the first pair of markers. Additionally, the second marked code portion includes a second starting marker of the second pair of markers, second code for a second application operation that is different from the first application operation, and a second ending marker of the second pair of markers. Furthermore, the first starting marker and the second starting marker include a same starting marker keyword to indicate that the first starting marker and the second starting marker are starting markers. Also, the first ending marker and the second ending marker include a same ending marker keyword to indicate that the first ending marker and the second ending marker are ending markers.

In some arrangements, the first pair of markers are different from the second pair of markers.

In some arrangements, the first marked code portion includes a first starting marker of the first pair of markers, first code for a first application operation, and a first ending marker of the first pair of markers. Additionally, the second marked code portion includes a second starting marker of the second pair of markers, second code for a second application operation that is different from the first application operation, and a second ending marker of the second pair of markers. Furthermore, the first starting marker and the first ending marker include a first unique keyword to uniquely identify the first marked code portion. Also, the second starting marker and the second ending marker include a second unique keyword to uniquely identify the second marked code portion.

In some arrangements, receiving the command includes receiving, as the selection parameter, an indicator that selectively has exactly one of:

a first value indicating a request for only coverage results corresponding to the set of unmarked code portions, a second value indicating a request for only coverage results corresponding to the set of marked code portions, and a third value indicating a request for coverage results corresponding to both the set of unmarked code portions and the set of marked code portions.

Additionally, the first value, the second value, and the third value are different from each other.

In some arrangements, running the test procedure includes launching the application on a test platform to run the application, and while the application is running on the test platform, inputting a set of test inputs to the application to exercise at least one unmarked section of the application and at least one marked section of the application to generate at least some of the section coverage data.

In some arrangements, generating the application coverage results from the section coverage data includes providing a first report that identifies a first coverage measurement indicating an amount of the set of unmarked sections that were tested when the indicator has the first value. Generating further includes providing a second report that identifies a second coverage measurement indicating an amount of the set of marked sections that were tested when the indicator has the second value. Generating further includes providing a third report that identifies a third coverage measurement indicating an amount of the set of unmarked sections and the set of marked sections that were tested when the indicator has the third value.

In some arrangements, the command to test the application includes a first parameter requesting one of the unmarked section coverage results and the marked section coverage results. Additionally, the method further includes, after running the test procedure and without rebuilding the application:

(A) receiving another command to test the application, the other command including a second parameter that requesting the other of the unmarked section coverage results and the marked section coverage results;

(B) re-running the test procedure that operates the application to generate other section coverage data; and (C) after re-running the test procedure, generating other application coverage results from the other section coverage data.

In some arrangements, the first parameter requests the unmarked section coverage results, and the second parameter requests the marked section coverage results. Additionally, the application coverage results describe test procedure coverage of the set of unmarked sections, and the other application results describe test procedure coverage of the marked sections.

In some arrangements, the first parameter requests the marked section coverage results, and the second parameter requests the unmarked section coverage results. Additionally, the application coverage results describe test procedure coverage of the set of marked sections, and the other application results describe test procedure coverage of the unmarked sections.

In some arrangements, the command to test the application includes a first parameter requesting one of the unmarked section coverage results and the marked section coverage results. Additionally, the method further includes, after running the test procedure and without rebuilding the application:

(A) receiving another command to test the application, the other command including a second parameter that requesting both the unmarked section coverage results and the marked section coverage results;

(B) re-running the test procedure that operates the application to generate other section coverage data; and (C) after re-running the test procedure, generating other application coverage results from the other section coverage data.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry, test platforms, etc. which are involved in ascertaining application test coverage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram illustrating how an application is built from source code in accordance with certain embodiments.

FIG. 4 is a block diagram of electronic circuitry which is suitable for use in accordance with certain embodiments.

FIG. 5 is a flowchart of a procedure which is performed in accordance with certain embodiments.

DETAILED DESCRIPTION

Improved techniques are directed to utilizing a specialized tool that distinguishes between a set of marked sections of an application and a set of unmarked sections of the application. Along these lines, testing of the application is performed and results are generated that describe test coverage of the set of marked sections only, the set of unmarked sections only, or both based on a command line selection parameter. Such a selection parameter may be provided at the time of initiating a test of the application. Such improved techniques alleviate the need to re-edit and re-build applications when ascertaining test coverage of different sections of the applications.

Figure 1:
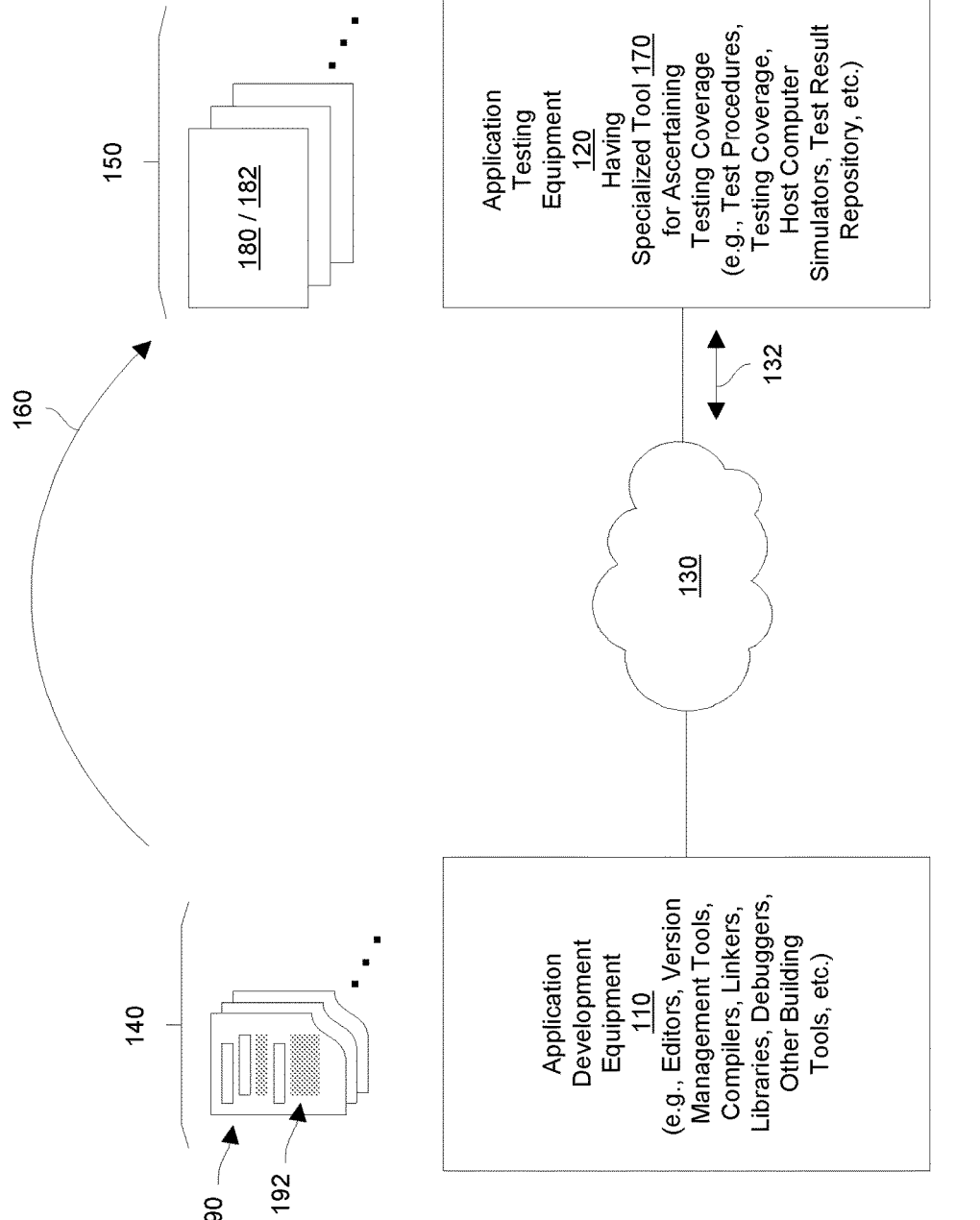
FIG. 1 is a block diagram of an electronic environment for developing and testing an application in accordance with certain embodiments.

FIG. 1 is a block diagram of an electronic environment 100 for developing and testing applications in accordance with certain embodiments. The electronic environment 100 includes application development equipment 110, application testing equipment 120, and communications media 130.

The application development equipment 110 is constructed and arranged to support development of software applications. Such development may include writing software code, editing or modifying the code, building binaries from the code, preliminary testing of the code, and so on. Accordingly, the application development equipment 110 may include resources such as editors, version management tools, compilers, linkers, libraries, debuggers, other application building tools, etc. that enable software developers to create software applications.

The application testing equipment 120 is constructed and arranged to test software applications. Such testing may include running test procedures that exercise applications, a specialized tool that ascertains testing coverage, host computer simulators, etc. Accordingly, the application testing equipment 120 may include resources such as processors, storage devices, communications interfaces, etc. that enable rich and reliable software application testing.

The communications media 130 is constructed and arranged to connect the various components of the electronic environment 20 together to enable these components to exchange electronic signals 132 (e.g., see the double arrow 132). The communications media 130 is illustrated as a cloud to indicate that the communications media 130 is capable of having a variety of different topologies including backbone, hub-and-spoke, loop, irregular, combinations thereof, and so on. Along these lines, the communications media 130 may include copper-based data communications devices and cabling, fiber optic devices and cabling, wireless devices, combinations thereof, etc. Furthermore, the communications media 130 is capable of supporting LAN-based communications, SAN-based communications, cellular communications, combinations thereof, etc.

In accordance with certain embodiments, at least some of the application development equipment 110 resides at different locations or sites (e.g., different offices or labs, different campuses, different cities, combinations thereof, etc.). In such a situation, one or more devices of the application development equipment 110 may communicate through the communications media 130.

In accordance with certain embodiments, at least some of the application testing equipment 120 resides at different locations or sites (e.g., different offices or labs, different campuses, different cities, combinations thereof, etc.). In such a situation, one or more devices of the application testing equipment 120 may communicate through the communications media 130.

During operation, human application developers write source code 140 and build (or make) applications 150 from the source code 140 utilizing the application development equipment 110. Such source code 140 may include one or more files containing instructions (or statements) written in one or more software languages to form a variety of software constructs such as routines, storage objects, libraries, and so on.

When an application 150 is ready for testing, the application 150 is transferred from the application development equipment 110 to the application testing equipment 120 (e.g., see arrow 160 in FIG. 1). Such a transfer may include additional configuration information, support files, and so on.

At the application testing equipment 120, the application 150 may be thoroughly tested (e.g., launched, exercised to generate test results, and evaluated based on the test results to determine whether the application 150 operates properly). As part of such testing, the application testing equipment 120 has a specialized tool 170 which is constructed and arranged to measure and report testing completeness (e.g., how much of the application 150 is covered by the testing).

In accordance with certain embodiments, the application development equipment 110 equips the application 150 with specialized coverage analysis features. Such features may enable branch statistics to be recorded, line execution counts to be saved, and so on in a manner similar to gcov and/or lcov. Accordingly, the application 150 may include a variety of additional files (e.g., .bb, .bbg, .da, etc.) that enable proper statistics measuring and/or outputting (e.g., as an annotated source listing, for viewing on a graphical user interface, combinations thereof, etc.).

Along these lines, it will be explained in further detail shortly that the specialized tool 170 of the application testing equipment 120 enables testing coverage to be ascertained for unmarked sections 180 of an application 150 and marked (or excludable) sections 182 of the application 150. Such unmarked sections 180 correspond to unmarked code portions 190 (unshaded in FIG. 1) of the source code 140. Similarly, such marked sections 182 correspond to marked code portions 192 (shaded in FIG. 1) of the source code 140. Further details of the specialized tool 160 will be provided shortly.

In accordance with certain embodiments, the specialized tool 170 provides testing coverage results with file granularity. By way of example, suppose that the application 150 was created from five separate source code files. In such a situation, the testing coverage results will indicate testing coverage results for each source code file of the five separate source code files. For example, the testing coverage results may indicate that the first source code file received 87% testing coverage, the second source code file received 50% testing coverage, the third source code file received 70% testing coverage, and so on. Other numbers of files are suitable, and other testing coverage results are possible.

In some embodiments, the application development equipment 110 and the application testing equipment 120 are co-located and/or tightly integrated to enable the application developers to more easily transition between source code writing and application testing. In a particular embodiment, the application development equipment 110 and the application testing equipment 120 resides on a single platform. In another embodiment, the application development equipment 110 and the application testing equipment 120 are distributed across multiple locations.

In a particular use case, the applications 150 that are developed within the electronic environment 100 are data storage applications that perform data storage operations on behalf of host computers, and associated management tools. Accordingly, the application testing equipment 120 may include specialized hardware such as storage processors, storage devices, and so on. Further details will now be provided with reference to FIG. 2.

FIG. 2 shows a set of source code files 200 containing unmarked code portions 190 and marked code portions 192. The particular instructions of the unmarked code portions 190 and marked code portions 192 are provided by way of example only.

Among the unmarked code portions 190 and marked code portions 192 within the set of source code files 200, there may be comments 210. However, it should be understood that such comments 210 are different from the unmarked code portions 190 and the marked code portions 192. For example, the comments 210 do not convert into any run time operations, while both the unmarked code portions 190 and the marked code portions 192 convert into run time operations.

As shown in FIG. 2, there is a first marked code portion 192 as follows:

```
// MARKED_COVERAGE_START - section_1234
} else {
    printf("Condition is false...!\n");
    return(1);
}
// MARKED_COVERAGE_STOP - section_1234
```

The first marked code portion 192 includes a first starting marker, code for a set of application operations, and a first ending marker.

In particular, the first starting marker is "MARKED_COVERAGE_START—section_1234". "MARKED_COVERAGE_START" is a keyword identifying this object as a starting marker.

The code for the set of application operations is printf("Condition is false . . . !\n"); return(1); Such code may perform useful work.

Additionally, the first ending marker is "MARKED_COVERAGE_STOP—section_1234". "MARKED_COVERAGE_STOP" is a keyword identifying this object as an ending marker.

The keyword term (or subterm) "MARKED_COVER-AGE" signifies that this is part of a specialized marker used to demarcate code for the specialized tool 170. The keyword terms "START" and "STOP" indicate whether the specialized marker begins a marked portion of source code or ends a marked portion of source code.

At this point, it should be understood that the first starting marker and the first ending marker form a first marker pair that delineates the first marked code portion 192. It should be understood that both the first starting marker and the first ending marker include "section_1234" which uniquely identify the first marker pair among other possible marker pairs within the source code 140.

Additionally, there is a second marked code portion 192 as follows:

```
// MARKED_COVERAGE_START - section_5678
printf("This line is part of black_content_5678\n");
printf("Also this line is part of black_content_5678\n");
printf("And this line is part of black_content_5678\n");
// MARKED_COVERAGE_STOP - section_5678
```

The second marked code portion 192 includes a second starting marker, code for a set of application operations, and a second ending marker.

In particular, the second starting marker is "MARKED_COVERAGE_START—section_5678". Again, "MARKED_COVERAGE_START" is a keyword identifying this object as a starting marker.

The code for the set of application operations is

```
printf("This line is part of black_content_5678\n");
printf("Also this line is part of black_content_5678\n");
printf("And this line is part of black_content 5678\n");
```

Such code may perform useful work.

Additionally, the second ending marker is "MARKED_COVERAGE_STOP—section_5678". Again, "MARKED_COVERAGE_STOP" is a keyword identifying this object as an ending marker.

It should be understood that the second starting marker and the second ending marker form a second marker pair that delineates the second marked code portion 192. It should be further understood that both the second starting marker and the second ending marker include "section_5678" which is a unique identifier that uniquely identifies the second marker pair among other possible marker pairs within the source code 140 such as the first marker pair.

Although the example in FIG. 2 includes only two marked sections 182, the application 150 may include more than two marked sections 182 (e.g., three, four, ten, twenty, etc.). Such marked sections 182 are non-overlapping and uniquely identified by the unique identifiers.

It should be further understood that the markers reside immediately after comment symbols (e.g., "//") in accordance with certain embodiments. Accordingly, a standard compiler ignores the markers as simply comments. However, the markers do convert into operations during run time. In some embodiments, an enhanced compiler (or build tool) generates executable code which is embedded within the executables. In other embodiments, the specialized tool 170 walks through the execution of the application 150 in locked step with the source code 140 during counting and processes the markers when the specialized tool 170 encounters the markers in the source code 140.

It should be further understood that the hyphen "-" is provided by way of example as a delimiter that separates the marker keyword portion of the markers with the unique identifier portion of the markers that identify marker pairs. Other delimiters and/or delimiting mechanisms are suitable for use as well.

It should also be noted that the source code 140 includes a set of unmarked code portions 190. Such unmarked code portions 190 simply include code which is not delineated by markers. That is, an unmarked code portion 190 is part of the source code 140 is not marked (or excluded) via markers. Further details will now be provided with reference to FIG. 3.

Figure 3:
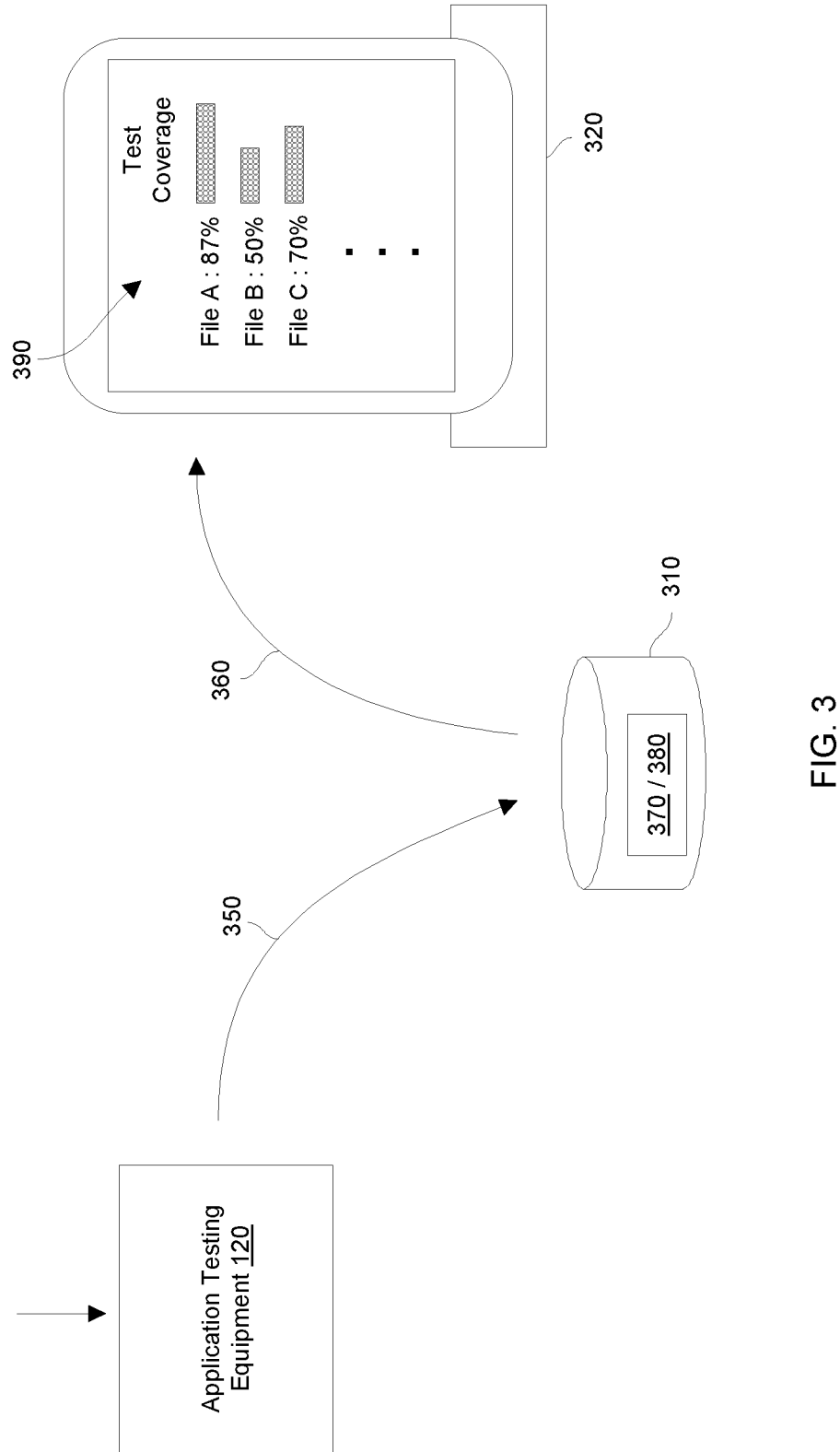
FIG. 3 is a block diagram of a process in accordance with certain embodiments.

FIG. 3 illustrates a process 300 performed by the specialized tool 170 to provide insights as to whether the application 150 has been properly tested and/or whether the application 150 operates properly in accordance with certain embodiments. Along these lines, the specialized tool 170 generates and processes test coverage results to identify degrees (or amounts) of untested instructions (or statements) of an application 150 in accordance with certain embodiments. Such operation does not require any re-editing and/or and re-building of the application 150 to analyze testing coverage of different application sections.

The process 300 involves the application testing equipment 120, a test result repository 310, and an output device 320. In some arrangements, the test result repository 310 and the output device 320 may be considered part of the application testing equipment 120. In other arrangements, the test result repository 310 and the output device 320 may be considered separate (or external) from the application testing equipment 120 (e.g., in which the results are saved and later evaluated remotely from the application testing equipment 120).

To initiate the process 300, a user provides a command 330 to the application testing equipment 120 to initiate the process 300. The command 330 includes a selection parameter 340 that requests particular coverage results. Such coverage results may include coverage results for a set of unmarked sections 180 of the application 150, a set of marked sections 182 of the application 150, or both (also see FIG. 1).

For example, the command 330 may include, as the selection parameter 340, a command line option such as "-marked" to request coverage results for all marked (or excluded) sections 182 of the application 150. As another example, the command 330 may include, as the selection parameter 340, a command line option such as "-unmarked" to request coverage results for all unmarked sections 180 of the application 150. As yet another example, the command 330 may include, as the selection parameter 340, a command line option such as "-both" to request coverage results for both unmarked sections 180 and marked sections 182 of the application 150.

In accordance with some embodiments, the selection parameter 340 may identify a particular marked section 182 of the application with specificity. For example, suppose that the source code 140 includes a marker pair which is identified by the marker identifier "section_1234". To specifically request coverage results for that marker pair, the command 330 may include, as the selection parameter 340, a command line option such as "-marked-section_1234" to request coverage results for the part of the application 150 corresponding to the portion of the source code 140 delineated by that marker pair.

It should be understood that the above-provided examples for the selection parameter 340 are merely illustrative and by way of example only. Other parameter formats, selection mechanisms, etc. are suitable for use as well.

As shown in FIG. 3, the process 300 involves multiple phases 350, 360. During the phase 350 (e.g., see the arrow 350), the application test equipment 120 runs a test procedure that operates the application 150 (e.g., runs the application 150). Such a test procedure may include test routines/scripts/test input data/test input parameters/etc. that exercise the different sections/features of the application 150. During such testing, test result data 370 is recorded (or captured) within the test result repository 310.

At least some of the test result data 370 includes section coverage data 380 which indicates how many times corresponding instructions of the source code 140 were executed when the test procedure tests the application 150 (e.g., line execution counts). In some arrangements, at least some of the test result data resides within a logfile of the test result repository 310.

During the phase 360 (e.g., see the arrow 360), the application test equipment 120 generates testing coverage results 390 from the section coverage data 380. Along these lines, the testing coverage results 390 describes test procedure coverage of at least one of the set of unmarked sections 180 of the application 150 (corresponding to the unmarked portions 190 of the source code 140) and the set of marked sections 182 of the application 150 (corresponding to the marked portions 192 of the source code 140).

In some embodiments, the specialized tool 170 provides the testing coverage results 390 with per file granularity. By way of example, FIG. 3 shows the testing coverage results 390 as indicating that 87% of the source code from File A was covered by the test procedure, 50% of the source code from File B was covered by the test procedure, 70% of the source code from File C was covered by the test procedure, and so on.

In some embodiments, the testing coverage results 390 may be displayed via a graphical user interface (GUI). In some embodiments, the test coverage results 390 may be outputted or rendered in a text-based format for easy display and/or file storage.

In accordance with certain embodiments, the test coverage results 390 may include a report that excludes marked sections 182 (e.g., generated using "-unmarked" as the selection parameter). Such an exclusion report is as follows:

```
FN:2,main
FNDA:1,main,
FNF:1
FNH:1
DA:2,1
DA:4,1
DA:5,1
DA:6,1
DA:13,1
DA:14,1
LF:6
LH:6
end_of_record
```

In accordance with certain embodiments, the test coverage results 390 may include a report that only includes marked sections 182 (e.g., generated using "-marked" as the selection parameter). Such an inclusion report is as follows:

```
DA:9,1
DA:10,0
LF:2
LH:0
end_of_record
```

In accordance with certain embodiments, the test coverage results 390 may include a report that includes both and unmarked sections 180 and the marked sections 182 (e.g., generated using "-both" as the selection parameter). Such a report is as follows:

```
                    FN:2,main
                    FNDA:1,main,
                    FNF:1
                    FNH:1
                    DA:2,1
                    DA:4,1
                    DA:5,1
                    DA:6,1
                    DA:9,0
                    DA:10,0
                    DA:13,1
                    DA:14,1
                    LF:8
                    LH:6
                    end_of_record
```

Such reports demonstrate the impact of using marker pairs with the specialized tool 170. Further details will now be provided with reference to FIG. 4.

FIG. 4 is a block diagram of electronic circuitry 400 which is suitable for at least a portion of the application testing equipment 150 (also see FIG. 1) in accordance with certain embodiments. The electronic circuitry 400 includes a set of interfaces 402, memory 404, processing circuitry 406, and other circuitry 408.

The set of interfaces 402 is constructed and arranged to connect the electronic circuitry 400 to the communications medium 130 (FIG. 1) to enable communications with other devices of the electronic environment 100 (e.g., the application development equipment 120). Such communications may be IP-based, SAN-based, cellular-based, cable-based, fiber-optic based, wireless, cloud-based, combinations thereof, and so on. Additionally, the set of interfaces 402 is constructed and arranged to connect the electronic circuitry 400 other local equipment such as the application development equipment 120. Accordingly, the set of interfaces 402 may include one or more host interfaces (e.g., a computer network interface, a fibre-channel interface, etc.), one or more storage device interfaces (e.g., a host adapter or HBA, etc.), and other interfaces. As a result, the set of interfaces 402 enables the electronic circuitry 400 to robustly and reliably communicate with various apparatus.

The memory 404 is intended to represent both volatile storage (e.g., DRAM, SRAM, etc.) and non-volatile storage (e.g., flash memory, magnetic memory, etc.). The memory 404 stores a variety of software constructs 420 including an operating system 422, specialized coverage code 424, and other code and data 426. The operating system 422 refers to particular control code such as a kernel to manage computerized resources (e.g., processor cycles, memory space, etc.), the I/O stack (e.g., drivers), and so on. The specialized coverage code 424 refers to particular instructions for providing testing coverage results from testing an application 150. The other code and data 426 refers to applications and routines to provide additional operations and services such as testing procedures that test applications 150, a repository for saving testing results, a GUI for rendering testing results, and so on.

The processing circuitry 406 is constructed and arranged to operate in accordance with the various software constructs 420 stored in the memory 404. Along these lines, the processing circuitry 406 executes the specialized coverage code 424 to form the specialized tool 170 that robustly and reliably provides testing coverage results describing testing coverage from performing a test procedure on an application 150. Such processing circuitry 406 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 440 is capable of delivering all or portions of the software constructs 420 to the electronic circuitry 400. In particular, the computer program product 440 has a non-transitory (or non-volatile) computer readable medium which stores a set of instructions that controls one or more operations of the electronic circuitry 400. Examples of suitable computer readable storage media include tangible articles of manufacture and apparatus which store instructions in a non-volatile manner such as DVD, CD-ROM, flash memory, disk memory, tape memory, and the like.

The other componentry 408 refers to other hardware of the electronic circuitry 400. Along these lines, the electronic circuitry 400 may further include specialized equipment such as data storage system hardware when the application 150 under test is data storage equipment that processes host I/O requests on behalf of a set of host computers. Further details will now be provided with reference to FIG. 5.

FIG. 5 is a flowchart of a procedure 500 which is performed by application testing equipment in accordance with certain embodiments. The procedure 500 ascertains application test coverage when a test procedure is performed on an application.

At 502, the application testing equipment receives a command to test an application having a set of unmarked sections and a set of marked sections. The command includes a selection parameter that requests at least one of unmarked section coverage results and marked section coverage results.

At 504, the application testing equipment runs a test procedure that operates the application to generate section coverage data. For example, the application under test may relate to data storage in which host I/O operations are performed on behalf of a set of host computers, and the application testing equipment saves section coverage data while the application provides data storage services while being tested.

At 506, the application testing equipment generates application coverage results from the section coverage data. The application coverage results describes test procedure coverage of at least one of the set of unmarked sections of the application and the set of marked sections of the application based on the selection parameter of the command.

As described above, improved techniques are directed to utilizing a specialized tool 170 that distinguishes between a set of marked sections 182 of an application 150 and a set of unmarked sections 180 of the application 150. Along these lines, testing of the application 150 is performed and results are generated that describe test coverage of the set of marked sections 182 only, the set of unmarked sections 180 only, or both based on a command line parameter 340. Such a parameter 340 may be provided at the time of initiating a test of the application 150. Such an improved technique alleviates the need to re-edit and re-build the application when ascertaining test coverage of different sections of an application.

One should appreciate that the above-described techniques do not merely collect and process data. Rather, the disclosed techniques involve improvements to certain technologies such as those that test applications. With such techniques, various advantages are available as well such as obtaining test coverage results for different sections of an application without having to rebuild the application from source code each time, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the application development equipment 110 is capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in agile methodology, a feature may be viewed as a service or function of the product that delivers business value and fulfills a customer's need and is delivered by a developer once the conditions and criteria that a software product must satisfy are met.

Before a feature meets the conditions and criteria, the new feature code is found in the product code, but its functionality is disabled, i.e., "black content".

It could be viewed that one of the most important criteria to meet is the level of feature code coverage.

While developing a new feature, developers may use code coverage tools to analyze their code to help create more efficient, faster running code and to discover untested parts of their programs. In addition, as part of the development process, the developer may be required to create a code coverage report both for regular code and black content code, but without affecting each other.

Unfortunately, conventional code coverage tools cannot distinguish black content from other content. Also, conventional code coverage tools may only provide coverage information per code file coverage information not per feature code.

One possibility is to comment out content using comment flags. Unfortunately, this always excludes the content and in order to include the content, the source code must be modified (e.g., to remove the comment flags) and then recompiled.

In accordance with certain embodiments, exclusion markers are used to mark black content (feature) code. Such markers enable black content and regular code to be distinguished from each other by a specialized tool.

Along these lines, using such exclusion markers opens new possibilities such as:

getting information about the product code coverage when the black code is excluded.

understanding the impact of the black content code when the feature is enabled.

creating a report for black content only when the feature is enabled.

easily exclude unused code, from the code coverage report, after new feature enablement.

A variety of other uses and possibilities are available as well.

In accordance with certain embodiments and by way of example, suppose the following exclusion markers are used to delineate (or demarcate) a portion of code:

EXCL_START—black_content_1234
EXCL_STOP—black_content_1234

Once provided, such exclusion markers enable a user to choose whether to include or exclude the marked content from the code coverage report. Along these lines, the user can create a code coverage report with feature related distinction (without feature code, with feature code, and with feature code only).

In some embodiments, the exclusion markers provide the ability to dynamically exclude or include specific content without changing the source code. In contrast, comment flags prevent code from being compiled (i.e., the content is always excluded) and thus cannot be used for debug code, internal utilities, etc.

In some embodiments, by using exclusion markers, a developer has the option to:

create different code coverage reports for regular code and for black content code, but without affecting each other.

be aligned with organization development process and proved code coverage information with feature related distinction.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of ascertaining application test coverage, comprising:

building an application having a set of unmarked sections and a set of marked sections from application code having a set of unmarked code portions that build into the set of unmarked sections and a set of marked code portions that build into the set of marked sections, the set of marked sections comprising code for a new feature that is disabled and the set of unmarked sections comprising regular code, wherein building the application includes identifying the set of unmarked code portions and the set of marked code portions within the application code based on a set of text-based markers, and wherein the set of text-based markers comprise exclusion markers that reside after comment symbols and begin and end each one of the marked code portions, thereby distinguishing the code for the new feature that is disabled from the regular code;

receiving a command to test the application, the command including a selection parameter that requests at least one of unmarked section coverage results and marked section coverage results, and wherein the command further includes a first parameter requesting the unmarked section coverage results;

running a test procedure that operates the application to generate section coverage data;

after running the test procedure, generating application coverage results from the section coverage data, the application coverage results describing test procedure coverage of at least one of the set of unmarked sections and the set of marked sections based on the selection parameter of the command; and after running the test procedure and without rebuilding the application:

receiving another command to test the application, the another command including a second parameter requesting the marked section coverage results, re-running the test procedure that operates the application to generate marked section coverage data, and after re-running the test procedure, generating second application coverage results from the marked section coverage data.

2. The method of claim 1 wherein identifying the set of unmarked code portions and the set of marked code portions within the application code includes:

detecting a first pair of markers that delineate a first marked code portion within the application code, and detecting a second pair of markers that delineate a second marked code portion within the application code.

3. The method of claim 2 wherein each unmarked code portion of the set of unmarked code portions is a code portion without a pair of markers.

4. The method of claim 2 wherein the first marked code portion and the second marked code portion are non-overlapping.

5. The method of claim 4 wherein the first marked code portion includes a first starting marker of the first pair of markers, first code for a first application operation, and a first ending marker of the first pair of markers;

wherein the second marked code portion includes a second starting marker of the second pair of markers, second code for a second application operation that is different from the first application operation, and a second ending marker of the second pair of markers;

wherein the first starting marker and the second starting marker include a same starting marker keyword to indicate that the first starting marker and the second starting marker are starting markers; and wherein the first ending marker and the second ending marker include a same ending marker keyword to indicate that the first ending marker and the second ending marker are ending markers.

6. The method of claim 2 wherein the first pair of markers are different from the second pair of markers.

7. The method of claim 6 wherein the first marked code portion includes a first starting marker of the first pair of markers, first code for a first application operation, and a first ending marker of the first pair of markers;

wherein the second marked code portion includes a second starting marker of the second pair of markers, second code for a second application operation that is different from the first application operation, and a second ending marker of the second pair of markers;

wherein the first starting marker and the first ending marker include a first unique keyword to uniquely identify the first marked code portion; and wherein the second starting marker and the second ending marker include a second unique keyword to uniquely identify the second marked code portion.

8. The method of claim 1 wherein receiving the command includes:

receiving, as the selection parameter, an indicator that selectively has exactly one of:

a first value indicating a request for only coverage results corresponding to the set of unmarked code portions, a second value indicating a request for only coverage results corresponding to the set of marked code portions, and a third value indicating a request for coverage results corresponding to both the set of unmarked code portions and the set of marked code portions; and wherein the first value, the second value, and the third value are different from each other.

9. The method of claim 8 wherein running the test procedure includes:

launching the application on a test platform to run the application, and while the application is running on the test platform, inputting a set of test inputs to the application to exercise at least one unmarked section of the set of unmarked sections and at least one marked section of the set of marked sections to generate at least some of the section coverage data.

10. The method of claim 9 wherein generating the application coverage results from the section coverage data includes:

providing a first report that identifies a first coverage measurement indicating an amount of the set of unmarked sections that were tested when the indicator has the first value, providing a second report that identifies a second coverage measurement indicating an amount of the set of marked sections that were tested when the indicator has the second value, and providing a third report that identifies a third coverage measurement indicating an amount of the set of unmarked sections and the set of marked sections that were tested when the indicator has the third value.

11. The method of claim 1 wherein the application coverage results describe test procedure coverage of the set of unmarked sections, and the second application coverage results describe test procedure coverage of the marked sections.

12. The method of claim 1 wherein the command to test the application includes a first parameter requesting one of the unmarked section coverage results and the marked section coverage results; and wherein the method further comprises, after running the test procedure and without rebuilding the application:

receiving another command to test the application, the another command including a second parameter requesting both the unmarked section coverage results and the marked section coverage results;

re-running the test procedure that operates the application to generate other section coverage data; and after re-running the test procedure, generating other application coverage results from the other section coverage data.

13. Electronic equipment, comprising:

memory; and control circuitry coupled to the memory, the memory storing instructions which, when carried out by the control circuitry, cause the control circuitry to perform a method of:

building an application having a set of unmarked sections and a set of marked sections from application code having a set of unmarked code portions that build into the set of unmarked sections and a set of marked code portions that build into the set of marked sections, the set of marked sections comprising code for a new feature that is disabled and the set of unmarked sections comprising regular code, wherein building the application includes identifying the set of unmarked code portions and the set of marked code portions within the application code based on a set of text-based markers, and wherein the set of text-based markers comprise exclusion markers that reside after comment symbols and begin and end each one of the marked code portions, thereby distinguishing the code for the new feature that is disabled from the regular code;

receiving a command to test the application, the command including a selection parameter that requests at least one of unmarked section coverage results and marked section coverage results, and wherein the command further includes a first parameter requesting the unmarked section coverage results;

running a test procedure that operates the application to generate section coverage data;

after running the test procedure, generating application coverage results from the section coverage data, the application coverage results describing test procedure coverage of at least one of the set of unmarked sections and the set of marked sections based on the selection parameter of the command; and after running the test procedure and without rebuilding the application:

receiving another command to test the application, the another command including a second parameter requesting the marked section coverage results, re-running the test procedure that operates the application to generate marked section coverage data, and after re-running the test procedure, generating second application coverage results from the marked section coverage data.

14. Electronic equipment as in claim 13 wherein running the test procedure includes:

generating the section coverage data while the control circuitry performs data storage operations to respond to host input/output (I/O) requests from a set of host computers.

15. A computer program product having a non-transitory computer readable medium which stores a set of instructions to process an application, the set of instructions, when carried out by computerized circuitry, causing the computerized circuitry to perform a method of:

building an application having a set of unmarked sections and a set of marked sections from application code having a set of unmarked code portions that build into the set of unmarked sections and a set of marked code portions that build into the set of marked sections, the set of marked sections comprising code for a new feature that is disabled and the set of unmarked sections comprising regular code, wherein building the application includes identifying the set of unmarked code portions and the set of marked code portions within the application code based on a set of text-based markers, and wherein the set of text-based markers comprise exclusion markers that reside after comment symbols and begin and end each one of the marked code portions, thereby distinguishing the code for the new feature that is disabled from the regular code;

receiving a command to test the application, the command including a selection parameter that requests at least one of unmarked section coverage results and marked section coverage results, and wherein the command further includes a first parameter requesting the unmarked section coverage results;

running a test procedure that operates the application to generate section coverage data;

after running the test procedure, generating application coverage results from the section coverage data, the application coverage results describing test procedure coverage of at least one of the set of unmarked sections and the set of marked sections based on the selection parameter of the command; and after running the test procedure and without rebuilding the application:

receiving another command to test the application, the another command including a second parameter requesting the marked section coverage results, re-running the test procedure that operates the application to generate marked section coverage data, and after re-running the test procedure, generating second application coverage results from the marked section coverage data.

* * * * *